US012055281B2

(12) United States Patent
Kim

(10) Patent No.: US 12,055,281 B2
(45) Date of Patent: Aug. 6, 2024

(54) DIGITAL MICROMIRROR DEVICE (DMD) HEADLAMP WITH OPTIMIZED COMPONENT PLACEMENT AND MOVING BODY INCLUDING SAME

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/449,050

(22) Filed: Aug. 14, 2023

(65) Prior Publication Data

US 2024/0060617 A1 Feb. 22, 2024

(30) Foreign Application Priority Data

Aug. 22, 2022 (KR) ........................ 10-2022-0104635

(51) Int. Cl.
*F21S 41/675* (2018.01)

(52) U.S. Cl.
CPC .................................. *F21S 41/675* (2018.01)

(58) Field of Classification Search
CPC ................................ F21S 41/67; F21S 41/675
See application file for complete search history.

(56) References Cited

U.S. PATENT DOCUMENTS 11,054,104 B2 * 7/2021 Mitterlehner ......... F21S 41/295
2019/0195459 A1 * 6/2019 Reisinger ........... G02B 26/0833

FOREIGN PATENT DOCUMENTS

KR 20200124966 A 11/2020

* cited by examiner

*Primary Examiner* — Robert J May
(74) *Attorney, Agent, or Firm* — Novo TechIP International PLLC

(57) ABSTRACT

A DMD headlamp disposed at a lower end of a low beam headlamp includes: a reflector unit reflecting light emitted from a light source; and a DMD board that includes a digital micromirror unit, a control unit, a power supply unit, and an outside connecting connector disposed on a Printed Circuit Board (PCB), the DMD board being disposed in an area to which light is reflected from the reflector unit to reflect the light to a projection lens, The outside connecting connector is disposed at the lower end of the DMD board so that a distance from a center point of the outside connecting connector to the lower end of the DMD board is smaller than a distance from the center point of the outside connecting connector to the upper end of the DMD board.

10 Claims, 7 Drawing Sheets

DIGITAL MICROMIRROR DEVICE (DMD) HEADLAMP WITH OPTIMIZED COMPONENT PLACEMENT AND MOVING BODY INCLUDING SAME

CROSS-REFERENCE TO RELATED APPLICATIONS

This application claims priority under 35 U.S.C. § 119 to Korean Patent Application No. 10-2022-0104635, filed on Aug. 22, 2022, in the Korean Intellectual Property Office, the disclosure of which is incorporated herein by reference in its entirety.

TECHNICAL FIELD

The following disclosure relates to a digital micromirror device (DMD) headlamp and a moving body, and more particularly, to a DMD headlamp with optimized component placement and a moving body including the same.

BACKGROUND

Recently, intelligent headlamps, which place great importance on safety, have been actively developed as headlamps for vehicles around the world, and the headlamps for vehicles have evolved along with the development of lighting technology using electricity. New types of light sources such as a sealed beam lamp using a headlamp like a single filament bulb, a halogen lamp using halogen gas, and a high-intensity discharge (HID) lamp in a high-voltage discharge type have emerged in succession. Since the 21st century, light emitting diode (LED) lamps using light emitting diodes have been greatly spotlighted.

Meanwhile, the traffic accident mortality rate is significantly higher at night than during the daytime. This is because the driver's field of vision is significantly narrower at night than during the daytime. A low beam for a vehicle is designed in such a manner that light is directed downward of the horizon, limiting the driver's field of vision such that a driver can see only a road for a short distance. Therefore, it is difficult to secure a sufficient long-distance field of vision while driving at night. On the other hand, a high beam helps to secure a field of vision so that a driver can see a distant object, but there are constraints in use because the high beam causes glare for drivers of other vehicles in front of the driver.

Accordingly, the high-resolution LED market has gradually expanded, and a high-resolution adaptive driving beam (ADB) system using a digital mirror has been commercialized. The ADB system is a system that combines the advantages of the low beam that causes no glare and the high beam that is capable of securing a driver's field of vision. In other words, when another vehicle appears in front of the vehicle or on the opposite-side road while driving in a high beam state at night, the ADB system is capable of preventing glare for a driver of the other vehicle.

FIG. 1 is a diagram illustrating a configuration of a conventional headlamp 10. As illustrated in FIG. 1, each of the identical left and right headlamps 10 includes a low beam headlamp 11, a digital micromirror device (DMD) headlamp 13 disposed at a lower end of the low beam headlamp 11, and an intelligent front-lighting system (IFS) 12. At this time, when outside connecting connectors 340 connected to the outside are disposed on the left or right sides of the respective DMD boards 300 of the left and right DMD headlamps 13, the symmetrical structure is distorted.

In the case of FIG. 1, the outside connecting connector 340 provided in the left headlamp causes no interference, and the shaping of the cable is also simple. On the other hand, the outside connecting connector 340 provided in the right headlamp causes interference, and the shaping of the cable is also complicated. Therefore, there are problems in that one of the left and right outside connecting connectors 340 may cause interference although the other one causes no interference, and the left and right cables are different from each other in shaping, which breaks the symmetrical structure.

SUMMARY

An embodiment of the present invention is directed to providing a digital micromirror device (DMD) headlamp with optimized component placement for improving reliability, and a moving body including the same.

In one general aspect, a digital micromirror device (DMD) headlamp disposed at a lower end of a low beam headlamp with optimized component placement includes: a reflector unit reflecting light emitted from a light source; and a DMD board that includes a digital micromirror unit, a control unit, a power supply unit, and an outside connecting connector disposed on a Printed Circuit Board (PCB), and disposed in an area to which light is reflected from the reflector unit to reflect the light to a projection lens. One end of the DMD board adjacent to the low beam headlamp is defined as an upper end of the DMD board, and an opposite end of the DMD board relatively far from the low beam headlamp is defined as a lower end of the DMD board. The outside connecting connector is disposed at the lower end of the DMD board so that a distance from a center point of the outside connecting connector to the lower end of the DMD board is smaller than a distance from the center point of the outside connecting connector to the upper end of the DMD board.

The outside connecting connector may be provided on a surface opposite to a surface of the DMD board facing the reflector unit.

The control unit and the power supply unit, which are Integrated Circuit (IC) chips, may be disposed on a first surface of the DMD board on which the outside connecting connector is also disposed, and the digital micromirror unit may be disposed on a second surface opposite to the first surface of the DMD board on which the outside connecting connector is disposed.

The digital micromirror unit may be disposed on a surface of the DMD board facing the reflector unit, the digital micromirror unit may include a predetermined first area and a predetermined second area, an allowable number of brightness-defective pixels in the first area may be smaller than an allowable number of brightness-defective pixels in the second area, and the first area and the second area may be arranged on the board so that light reflected by the first area is projected as a high beam through the projection lens, and light reflected by the second area is projected as a low beam through the projection lens.

The allowable number of brightness-defective pixels in the first area may be zero.

The digital micromirror unit may be disposed to be above, or higher than, the control unit, and the digital micromirror unit and the control unit may be arranged and spaced apart from each other so that a difference in length between a plurality of cables connecting the digital micromirror unit and the control unit to each other is smaller than or equal to a predetermined standard, and the digital micromirror unit and the control unit may be vertically aligned with each other.

The difference in length between the plurality of cables connecting the digital micromirror unit and the control unit to each other may be 25.4 mm or less.

The control unit and the power supply unit may be disposed on a first surface of the DMD board opposite to a second surface of the DMD board that is facing the reflector unit.

In another general aspect, a moving body includes a low beam headlamp, an intelligent front-lighting system, and a DMD headlamp disposed at a lower end of the low beam headlamp with optimized component placement, the DMD headlamp including: a reflector unit reflecting light emitted from a light source; and a DMD board including a digital micromirror unit, a control unit, a power supply unit, and an outside connecting connector disposed on a board (PCB), and disposed in an area to which light is reflected from the reflector unit to reflect the input light to be projected through a projection lens, wherein when one end of the DMD board relatively close to the low beam headlamp is defined as an upper end of the DMD board, and the other end of the DMD board relatively far from the low beam headlamp is defined as a lower end of the DMD board, the outside connecting connector is disposed at the lower end of the DMD board so that a distance from a center point of the outside connecting connector to the lower end of the DMD board is smaller than a distance from the center point of the outside connecting connector to the upper end of the DMD board, and the DMD headlamp is disposed at the lower end of the low beam headlamp and on a lateral side of the intelligent front-lighting system.

The DMD headlamp with optimized component placement and the moving body including the same according to several aspects of the present invention as described above are advantageous in that the complexity of assembly can be reduced by optimizing the components of the DMD headlamp.

In addition, the DMD headlamp with optimized component placement and the moving body including the same according to several aspects of the present invention as described above are advantageous in that a symmetrical structure can be achieved by disposing the outside connecting connector at the lower end of the DMD board and on the rear surface of the DMD board, thereby eliminating interference between cables connected to the low beam and the connector.

In addition, the DMD headlamp with optimized component placement and the moving body including the same according to several aspects of the present invention as described above are advantageous in that glare can be prevented by optimally disposing the digital micromirror unit.

DETAILED DESCRIPTION

The present invention, the advantages in the operation of the present invention, and the objects accomplished by implementing the present invention will be described with reference to preferred embodiments of the present invention exemplified hereinbelow.

First, it should be noted that terms used herein are used only to describe the specific embodiments and are not intended to limit the present invention. Singular expressions may include plural expressions unless the context clearly indicates otherwise. It should also be noted that terms “include”, “have”, and the like used herein are intended to specify the presence of stated features, numbers, steps, operations, components, parts, or combinations thereof but do not preclude the presence or addition of one or more other features, numbers, steps, operations, components, parts, or combinations thereof.

In describing the present invention, a detailed description of a related known configuration or function that may obscure the gist of the present invention will be omitted.

Figure 1:
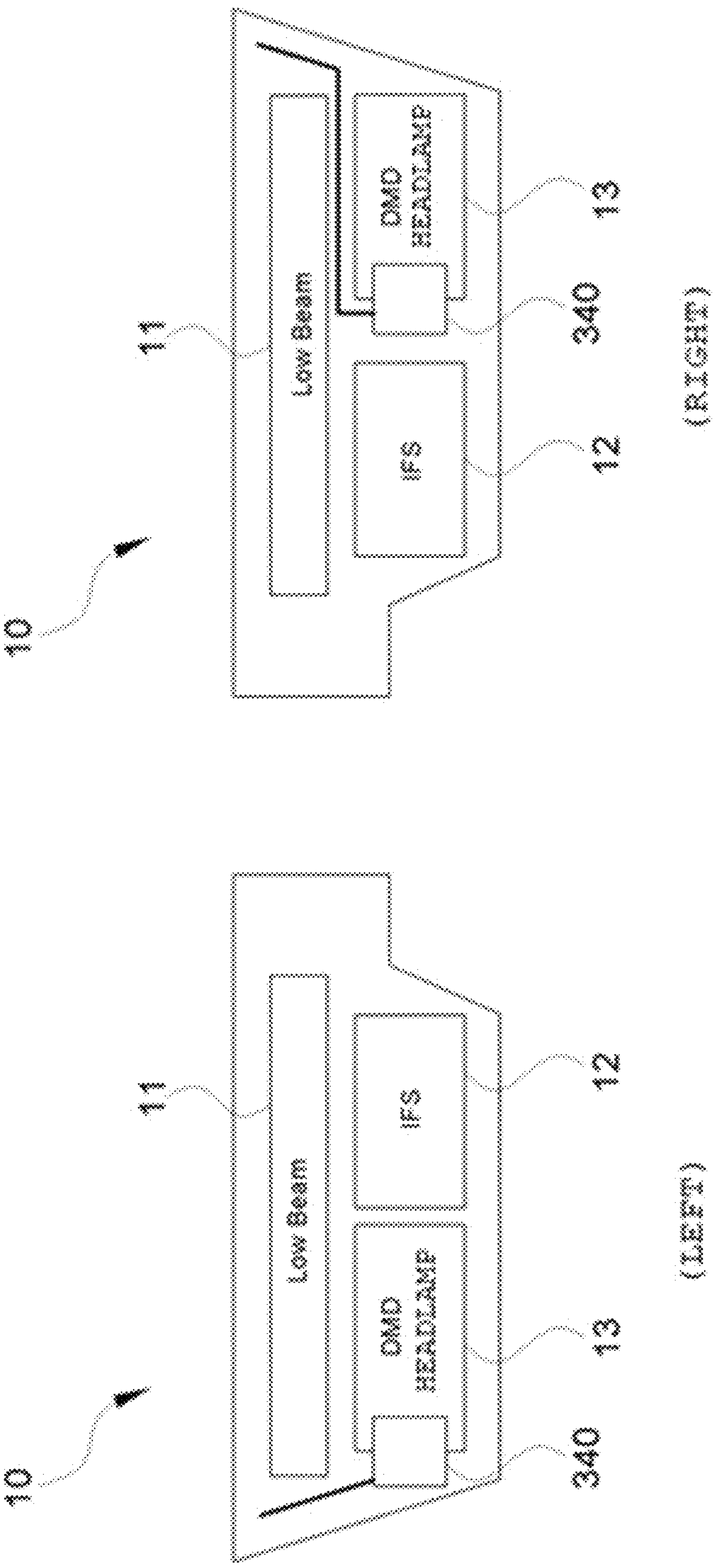
FIG. 1 PRIOR ART
FIG. 1 is a diagram illustrating a configuration of a conventional headlamp.
Figure 2:
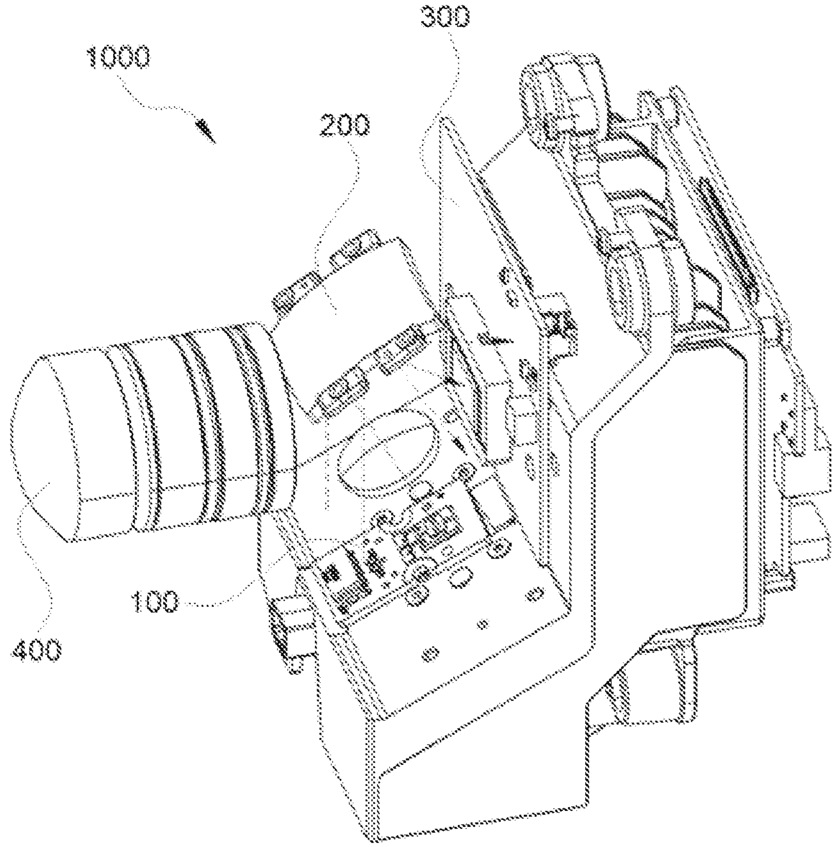
FIG. 2 is a diagram illustrating a digital micromirror device (DMD) headlamp according to an embodiment of the present invention.

FIG. 2 is a diagram illustrating a DMD headlamp according to an embodiment of the present invention.

Figure 3:
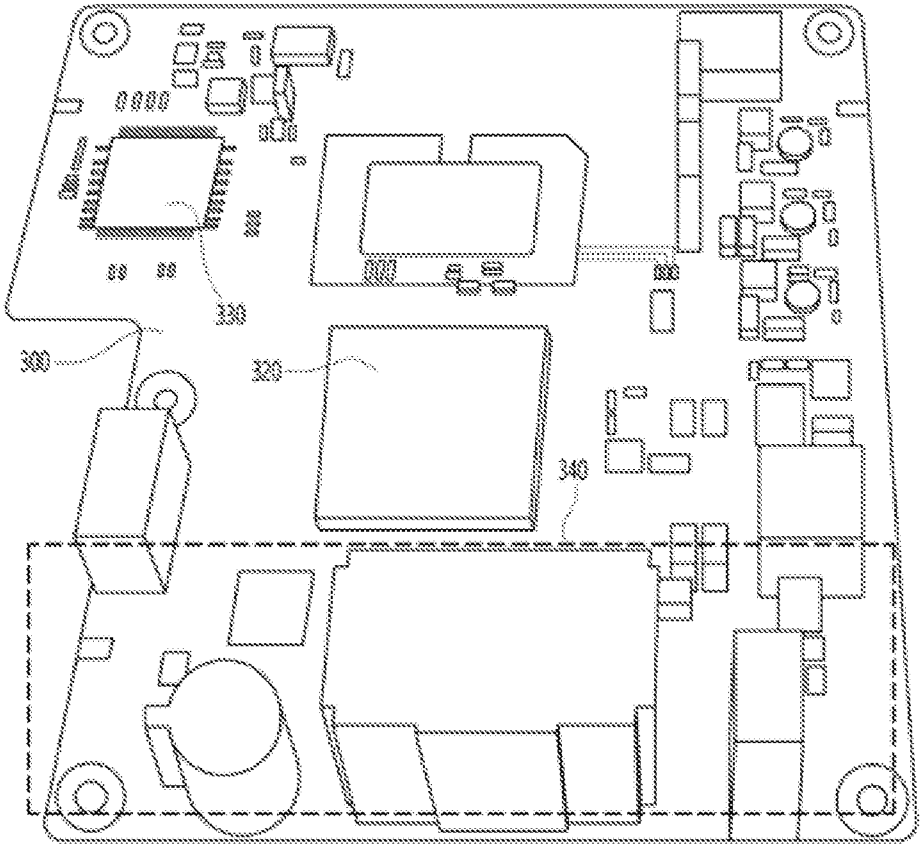
FIG. 3 is an enlarged view illustrating a rear side portion of a DMD board of FIG. 2.
Figure 4:
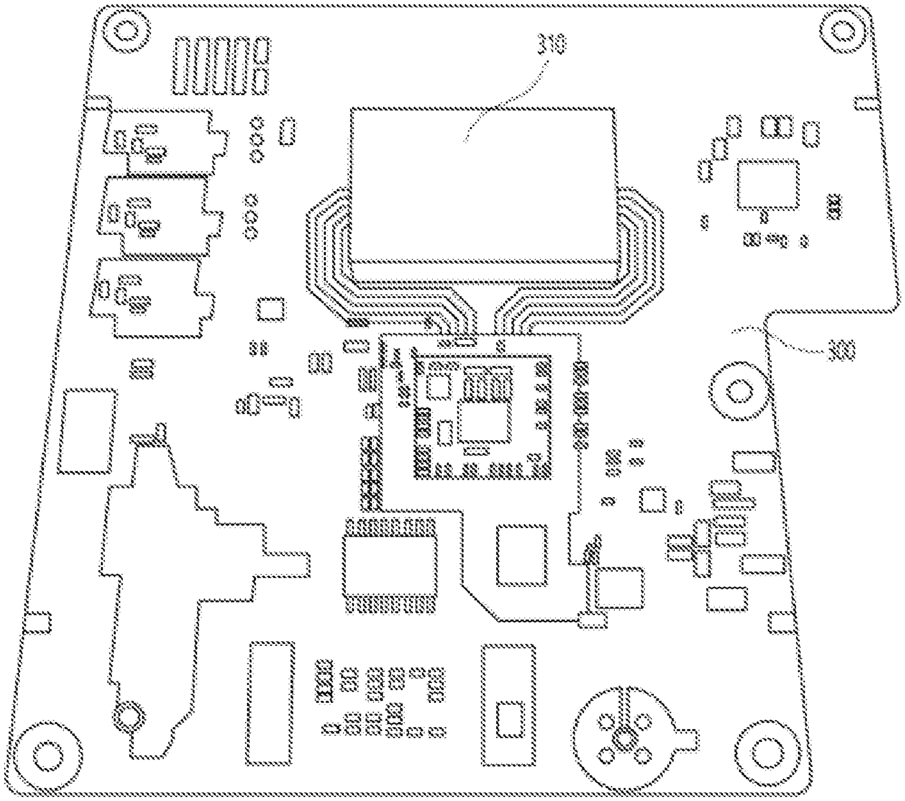
FIG. 4 is an enlarged view illustrating a front side portion of the DMD board of FIG. 2.

FIG. 3 is an enlarged view illustrating a rear side portion of a DMD board of FIG. 2, and FIG. 4 is an enlarged view illustrating a front side portion of the DMD board of FIG. 2.

A DMD headlamp 1000 will be described with reference to FIGS. 2 to 4.

The DMD headlamp 1000 disposed below a low beam headlamp 11 according to an embodiment of the present invention includes a reflector unit 200 and a DMD board 300.

The reflector unit 200 reflects light emitted from a light source 100.

The DMD board 300 includes a digital micromirror unit 310, a control unit 320, a power supply unit 330, and an outside connecting connector 340 disposed on a board (PCB).

The digital micromirror unit 310 includes a plurality of micromirrors, and the control unit 320 controls the digital micromirror unit 310.

Concerning the operational relationship between the components, the reflector unit 200 reflects light emitted from the light source 100, and the DMD board 300 disposed in an area to which light is reflected from the reflector unit 200 reflects the light once more. The light reflected by the DMD board 300 is projected to the outside through a projection lens 400.

Here, one end of the DMD board 300 relatively close to the low beam headlamp 11 may be defined as an upper end of the DMD board 300, and the other end of the DMD board 300 relatively far from the low beam headlamp 11 may be defined as a lower end of the DMD board 300. In this case, the outside connecting connector 340 may be disposed at the lower end of the DMD board 300 so that a distance from the center point of the outside connecting connector 340 to the lower end of the DMD board 300 is smaller than a distance from the center point of the outside connecting connector 340 to the upper end of the DMD board 300. As a result, the outside connecting connector 340 and a cable connected to the outside connecting connector 340 can be prevented from interfering with the low beam headlamp 11 and a cable and the like connected to the low beam headlamp 11.

In addition, the outside connecting connector 340 may be provided on a surface opposite to the surface facing the reflector unit 200 to be commonly usable for either one of the left and right DMD headlamps 1000. As a result, the cable connected to the outside connecting connector 340 of each of the left and right DMD headlamps 1000 can be prevented from interfering with the low beam headlamp 11 provided at the upper end of the DMD board 300 and the cable connected to the low beam headlamp 11, thereby making it possible to simplify the shaping of the cable.

Furthermore, the outside connecting connector 340 is disposed at the center of the DMD board 300 so that the DMD board 300 can be commonly used for either one of the left and right DMD headlamps 1000.

As a result, it is possible to eliminate interference with the low beam headlamp 11, and one DMD board 300 can be used as either one of the left and right DMD boards 300, thereby making it easy to manage components, simplifying the kinds of required components, lowering the unit price of components due to an increase in production of identical components, and reducing the complexity of assembly.

Meanwhile, the control unit 320 and the power supply unit 330, which are IC chips, may be provided on a surface of the board on which the outside connecting connector 340 is provided, and the digital micromirror unit 310 may be provided on a surface opposite to the surface of the board on which the outside connecting connector 340 is provided.

Specifically, it is required that light emitted from the light source 100 be accurately incident on the digital micromirror unit 310, but there is a problem in that the light bounces around due to diffused reflection. The peripheral circuit elements provided in the DMD board 300 except the digital micromirror unit 310, i.e., the control unit 320 and the power supply unit 330, may be damaged by diffusely reflected light and heat resulting therefrom. Therefore, the control unit 320 and the power supply unit 330, which are weak to heat, are disposed on a surface opposite to the surface of the board facing the reflector unit 200, thereby preventing the control unit 320 and the power supply unit 330 from malfunction or being damaged by heat caused by diffusely reflected light.

FIG. 4 is an enlarged view illustrating the front side portion of the DMD board of FIG. 2.

Figure 5:
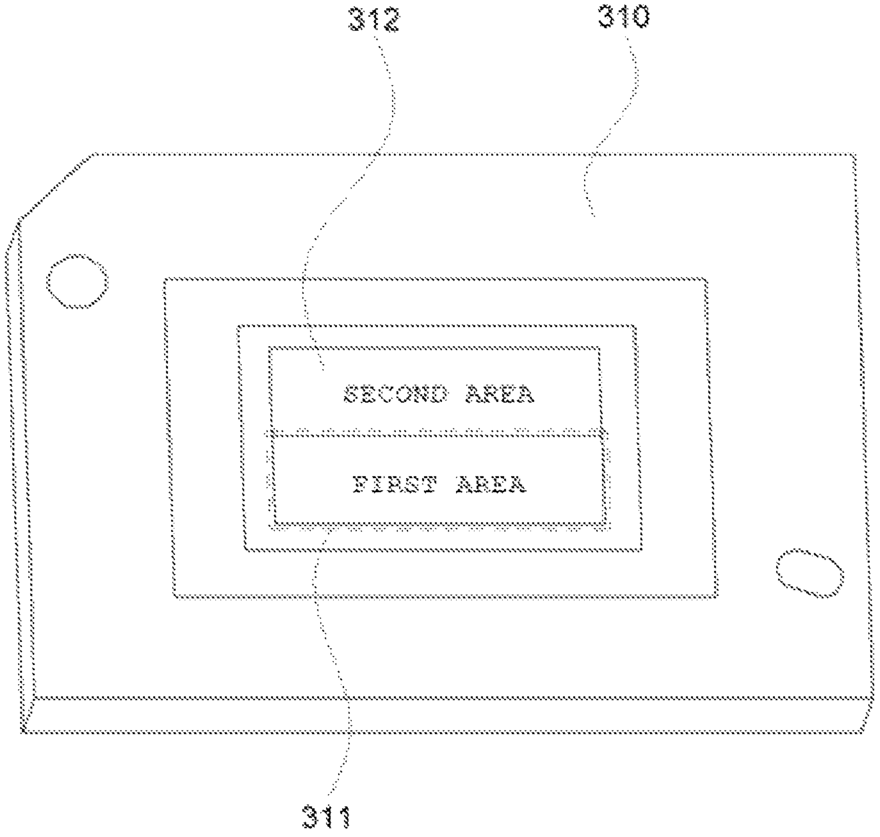
FIG. 5 is an enlarged view illustrating a digital micromirror unit of FIG. 2.

FIG. 5 is an enlarged view illustrating the digital micromirror unit of FIG. 2.

The configuration of the front side portion of the DMD board 300 will be described with reference to FIGS. 4 and 5.

As illustrated in FIG. 4, the digital micromirror unit 310 may be disposed on a surface of the board facing the reflector unit 200.

In addition, as illustrated in FIG. 5, the digital micromirror unit 310 includes a predetermined first area 311 and a predetermined second area 312. Meanwhile, the area in charge of a high beam (ADB) in the digital micromirror unit 310 needs to be a highly reliable area to prevent glare while the ADB function is operated. Therefore, the allowable number of brightness-defective pixels in the first area 311 may be smaller than the allowable number of brightness-defective pixels in the second area 312.

Specifically, when the first area 311 and the second area 312 are arranged based on the allowable number of brightness-defective pixels, the allowable number of brightness-defective pixels in the first area (high beam area) 311 may be zero. In addition, the allowable number of brightness-defective pixels in the second area (low beam area) 312, which is an area other than the first area 311, may be six or smaller. As a result, the first area 311 and the second area 312 can be arranged on the board so that light reflected in the first area 311 is projected as a high beam through the projection lens 400, and light reflected in the second area 312 is projected as a low beam through the projection lens 400.

Figure 6:
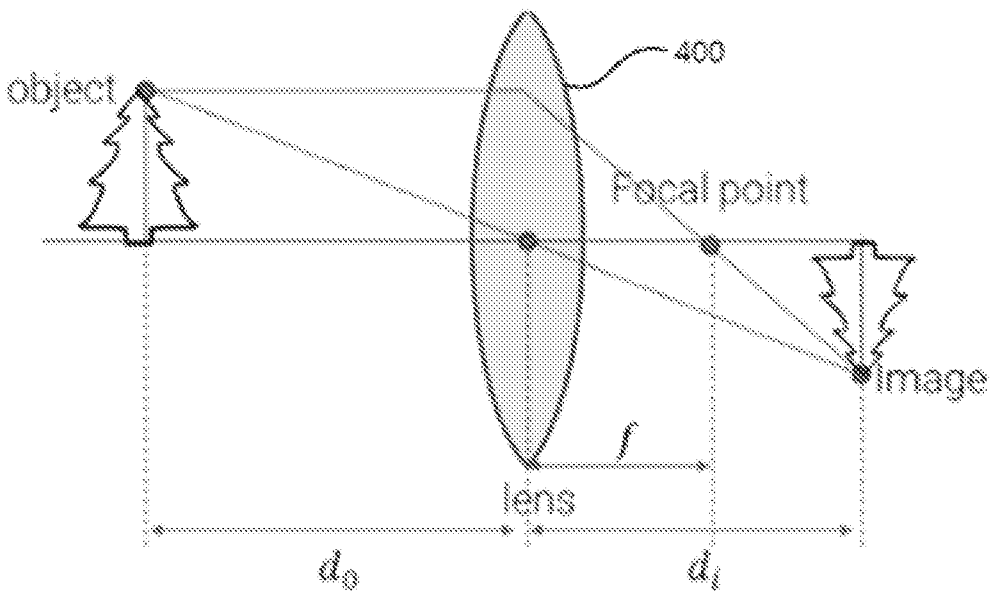
FIG. 6 is a diagram illustrating an image projected through a projection lens.

FIG. 6 is a diagram illustrating an image projected through the projection lens 400.

As illustrated in FIG. 6, in a certain case, light reflected from the DMD board 300, particularly the digital micromirror unit 310, may be turned upside down while passing through the projection lens 400.

In this case, the first area 311 in charge of the ADB function may be positioned on the board to be lower than the second area 312 so that a distance from the center point of the first area 311 to the lower end of the DMD board 300 is smaller than a distance from the center point of the second area 312 to the lower end of the DMD board 300.

In addition, a plurality of cables for connection between the digital micromirror unit 310 and the control unit 320 may be further included.

The digital micromirror unit 310 and the control unit 320 are connected to each other through a low-voltage differential signal (LVDS) interface. The LVDS interface refers to a high-speed long-distance digital interface for serial communication through two copper wires separated from each other.

In this case, the LVDS interface includes five pairs of differential lines. In order to synchronize the five pairs of data lines, the lengths of the cables need to be kept as equal as possible.

If the digital micromirror unit 310 and the control unit 320 are disposed to be skewed in different directions, in order to match the length of one of the cables connecting the digital micromirror unit 310 and the control unit 320 to each other at the longest distance, the other cables need to be twisted. In this case, signal attenuation may occur because of the long distance.

Therefore, in order to match the cables in length as short as possible, the digital micromirror unit 310 may be disposed to be higher than the control unit 320, the digital micromirror unit 310 and the control unit 320 may be spaced apart from each other at a constant distance so that a difference in length between the plurality of cables connecting the digital micromirror unit 310 and the control unit 320 to each other is smaller than or equal to a predetermined standard, and the digital micromirror unit 310 and the control unit 320 may be vertically aligned in parallel to each other.

Specifically, the difference in length between the plurality of cables connecting the digital micromirror unit 310 and the control unit 320 to each other may be 25.4 mm or less.

In addition, a moving body according to another embodiment of the present invention may include a low beam headlamp 11, an intelligent front-lighting system (IFS) 12, and a DMD headlamp 1000.

The DMD headlamp 1000 includes a reflector unit 200 and a DMD board 300, which have the same features as described above. Thus, the description thereof is omitted.

Figure 7:
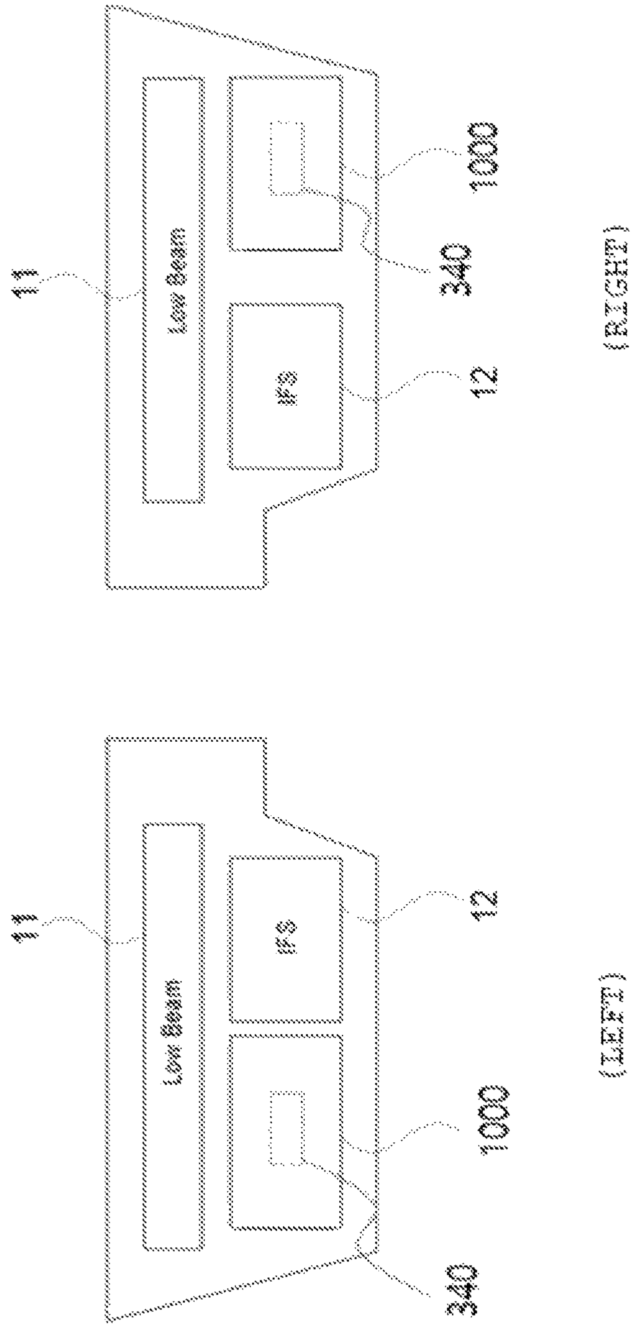
FIG. 7 is a diagram illustrating headlamps including the DMD headlamp according to an embodiment of the present invention.

Meanwhile, the DMD headlamp 1000 may be disposed at the lower end of the low beam headlamp 11 and on the lateral side of the IFS 12. FIG. 7 is a diagram illustrating headlamps including the DMD headlamp according to an embodiment of the present invention. The outside connecting connector 340 may be disposed at the lower end of the DMD board 300 so that a distance from the center point of the outside connecting connector 340 to the lower end of the DMD board 300 is smaller than a distance from the center point of the outside connecting connector 340 to the upper end of the DMD board 300, thereby preventing the outside connecting connector 340 and a cable connected to the outside connecting connector 340 from interfering with the low beam headlamp 11 and a cable and the like connected to the low beam headlamp 11.

In addition, the outside connecting connector 340 may be provided on a surface opposite to the surface facing the reflector unit 200 to be commonly usable for either one of the left and right DMD headlamps 1000. As a result, the cable connected to the outside connecting connector 340 of each of the left and right DMD headlamps 1000 can be prevented from interfering with the low beam headlamp 11 provided at the upper end of the DMD board 300 and the cable connected to the low beam headlamp 11, thereby making it possible to simplify the shaping of the cable.

Furthermore, the outside connecting connector 340 is disposed at the center of the DMD board 300 so that the DMD board 300 can be commonly used for either one of the left and right DMD headlamps 1000.

As a result, it is possible to eliminate interference with the low beam headlamp 11, and one DMD board 300 can be used as either one of the left and right DMD boards 300, thereby making it easy to manage components, simplifying the kinds of required components, lowering the unit price of components due to an increase in production of identical components, and reducing the complexity of assembly.

The moving body is omitted from FIG. 7.

Although the preferred embodiments of the present invention have been described above, the embodiments disclosed herein are not intended to limit the technical idea of the present invention, but are provided to explain the technical idea of the present invention. Therefore, the technical idea of the present invention includes not only each of the embodiments disclosed herein but also a combination of the embodiments disclosed here, and furthermore, the scope of the technical idea of the present invention is not limited by these embodiments. In addition, those skilled in the art to which the present invention pertains may make numerous changes and modifications to the present invention without departing from the spirit and scope of the appended claims, and all of such appropriate changes and modifications shall be regarded as falling within the scope of the present invention as equivalents.

What is claimed is:

1. A digital micromirror device (DMD) headlamp disposed at a lower end of a low beam headlamp, the DMD headlamp comprising:

a reflector unit reflecting light emitted from a light source; and a DMD board that includes a digital micromirror unit, a control unit, a power supply unit, and an outside connecting connector disposed on a Printed Circuit Board (PCB), the DMD board being disposed in an area to which light is reflected from the reflector unit to reflect the light to a projection lens, wherein, when one end of the DMD board closest to the low beam headlamp is defined as an upper end of the DMD board, and an opposite end of the DMD board is defined as a lower end of the DMD board, the outside connecting connector is disposed at the lower end of the DMD board so that a distance from a center point of the outside connecting connector to the lower end of the DMD board is smaller than a distance from the center point of the outside connecting connector to the upper end of the DMD board.

2. The DMD headlamp of claim 1, wherein the outside connecting connector is provided on a surface opposite to a surface of the DMD board facing the reflector unit.

3. The DMD headlamp of claim 1, wherein the control unit and the power supply unit, which are Integrated Circuit (IC) chips, are disposed on a first surface of the DMD board on which the outside connecting connector is also disposed, and the digital micromirror unit is disposed on a second surface opposite to the first surface of the DMD board on which the outside connecting connector is disposed.

4. The DMD headlamp of claim 1, wherein the digital micromirror unit is disposed on a surface of the DMD board facing the reflector unit, the digital micromirror unit includes a predetermined first area and a predetermined second area, an allowable number of brightness-defective pixels in the first area is smaller than an allowable number of brightness-defective pixels in the second area, and the first area and the second area are arranged on the DMD board so that light reflected by the first area is projected as a high beam through the projection lens, and light reflected by the second area is projected as a low beam through the projection lens.

5. The DMD headlamp of claim 4, wherein the allowable number of brightness-defective pixels in the first area is zero.

6. The DMD headlamp of claim 1, wherein the digital micromirror unit is disposed above the control unit, and the digital micromirror unit and the control unit are arranged and spaced apart from each other so that a difference in length between a plurality of cables connecting the digital micromirror unit and the control unit to each other is smaller than or equal to a predetermined standard, and the digital micromirror unit and the control unit are vertically aligned with each other.

7. The DMD headlamp of claim 6, wherein the difference in length between the plurality of cables connecting the digital micromirror unit and the control unit to each other is 25.4 mm or less.

8. The DMD headlamp of claim 1, wherein the control unit and the power supply unit are disposed on a first surface of the DMD board opposite to a second surface of the DMD board that is facing the reflector unit.

9. The DMD headlamp of claim 1, wherein the control unit and the power supply unit are Integrated Circuit (IC) chips.

10. A moving body comprising:

a low beam headlamp;

an intelligent front-lighting system; and the DMD headlamp of claim 1, wherein the DMD headlamp is disposed at a lower end of the low beam headlamp and on a lateral side of the intelligent front-lighting system.

* * * * *